US010225406B1

(12) United States Patent
Avital et al.

(10) Patent No.: US 10,225,406 B1
(45) Date of Patent: Mar. 5, 2019

(54) METHOD, APPARATUS AND COMPUTER PROGRAM PRODUCT FOR DETERMINING WHETHER TO ESTABLISH A CALL IN A CLICK-TO-CALL ENVIRONMENT

(71) Applicant: EMC IP Holding Company LLC, Hopkinton, MA (US)

(72) Inventors: Aviv Avital, Be'er Sheeva (IL); Evgeny Mayzel, Be'er Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/283,039

(22) Filed: Sep. 30, 2016

(51) Int. Cl.
   *H04M 3/51* (2006.01)
   *H04M 7/00* (2006.01)
   *H04M 3/436* (2006.01)
   *G06Q 30/02* (2012.01)

(52) U.S. Cl.
   CPC ...... *H04M 3/5191* (2013.01); *G06Q 30/0246* (2013.01); *G06Q 30/0273* (2013.01); *H04M 3/436* (2013.01); *H04M 7/003* (2013.01)

(58) Field of Classification Search
   CPC ..... H04M 7/003; H04M 3/436; H04M 3/5191
   See application file for complete search history.

(56) References Cited

U.S. PATENT DOCUMENTS

| 8,077,849 B2 * | 12/2011 | Altberg | H04L 29/06027 379/201.01 |
| 2010/0128862 A1 * | 5/2010 | Vendrow | H04M 3/38 379/198 |
| 2014/0128047 A1 * | 5/2014 | Edwards | H04L 51/12 455/415 |

* cited by examiner

*Primary Examiner* — Nafiz E Hoque
(74) *Attorney, Agent, or Firm* — Krishnendu Gupta

(57) ABSTRACT

There are disclosed techniques for determining whether to establish a call in a click-to-call environment. In one embodiment, there is disclosed a method, comprising the step of receiving a communication resulting from an interaction between a user and a click-to-call feature. The method also comprises the step of performing an analysis of the communication to determine a risk in connection with the communication. The method further comprises determining whether to establish a call between the user and a helper associated with the click-to-call feature based on the risk in connection with the communication.

9 Claims, 3 Drawing Sheets

METHOD, APPARATUS AND COMPUTER PROGRAM PRODUCT FOR DETERMINING WHETHER TO ESTABLISH A CALL IN A CLICK-TO-CALL ENVIRONMENT

TECHNICAL FIELD

The present invention relates to security. More particularly, the present invention relates to a method, an apparatus and a computer program product for determining whether to establish a call in a click-to-call environment.

BACKGROUND OF THE INVENTION

The World Wide Web has made it easy for consumers and merchants to find each other. Consumers utilize search engines and keyword searches to identify merchants of desired goods and services, and then websites and other on-line research tools allow consumers to sift through the results to find what they are looking for. For merchants, sponsored searches and pay for placement advertising allow merchants to get their products and services in front of target consumers, i.e., consumers who have already indicated an interest in those products or services.

In the pay for placement model, merchants may subscribe with an enterprise service provider for presentation of their advertisements in response to a given search query. In particular, a merchant may set up the subscription by specifying keywords relating to their goods/services, so that when a consumer performs a search including these keywords, the merchant's advertisement is presented along with the rest of the search results. The merchant is typically billed in a pay-per-click (PPC) model, where the merchant is charged each time a consumer selects the merchant's advertisement by clicking on it and being transferred to the merchant's site (or otherwise provided with information of the merchant's choosing). The number of times that an advertisement is clicked on, divided by the number of times that the advertisement appears, is referred to as the click through rate (CTR) for the advertisement.

Merchants have become sophisticated in their advertising techniques. Many merchants employ software tools and operational resources in an attempt to accurately and regularly track the CTR and success rate of their advertisements. Merchants are constantly seeking new and improved methods for obtaining information about their advertising campaigns and target audience in an attempt to maximize their advertising exposure to their target audience, and the return on their advertising dollars.

Despite the ubiquity of the Internet as an advertising tool, many consumers still prefer to speak to a live person at the merchant's place of business, to find out additional information and complete a sale. While traditional public switched telephone networks (PSTN) are still the preferred mode of telephone communication, voice over IP (VoIP) is gaining in popularity. VoIP operates by delivering voice information over the Internet using the Internet Protocol (IP), which sends voice information in digital form in discrete packets rather than in the traditional circuit-committed protocols of the PSTN.

On-line advertising has expanded to take advantage of VoIP. For example, in the click-to-call (C2C) model, a user can locate an advertiser, either through unsponsored search results or via the sponsored PPC model, and then click on a provided telephone number to connect to the merchant using IP telephony. As the majority of merchants receive telephone calls using traditional PSTN telephones, the C2C model generally results in telephone charges to the consumer. Often, a consumer will decide not to call a merchant because the consumer does not want to incur the telephone charges. By not receiving these calls, at least a portion of which would have resulted in sales, the merchant is losing potential revenue.

To entice more consumers to call, a merchant can purchase a toll free phone number from a telecommunications service provider and thus pay for incoming calls on behalf of customers. Toll free phone numbers are expensive however, and their costs difficult to contain. If more customers call the toll free number, or if calls last longer than expected, merchants may be left with significant unanticipated costs to cover. As a result, the merchant is exposed to competitors exploiting the service and harming the merchant financially by misusing the service and causing false charges. There is, therefore, a need to address this matter.

SUMMARY OF THE INVENTION

There is disclosed a method, comprising: receiving, by processing circuitry, a communication resulting from an interaction between a user and a click-to-call feature; performing, by processing circuitry, an analysis of the communication to determine a risk in connection with the communication; and based on the risk in connection with the communication, determining, by processing circuitry, whether to establish a call between the user and a helper associated with the click-to-call feature.

There is also disclosed an apparatus, comprising: memory; and processing circuitry coupled to the memory, the memory storing program code which, when executed by the processing circuitry, cause the processing circuitry to: receive a communication resulting from an interaction between a user and a click-to-call feature; perform an analysis of the communication to determine a risk in connection with the communication; and based on the risk in connection with the communication, determine whether to establish a call between the user and a helper associated with the click-to-call feature.

There is further disclosed a computer program product having a non-transitory computer readable medium which stores a set of instructions, the set of instructions, when carried out by processing circuitry, causing the processing circuitry to perform a method, the method comprising: receiving a communication resulting from an interaction between a user and a click-to-call feature; performing an analysis of the communication to determine a risk in connection with the communication; and based on the risk in connection with the communication, determining whether to establish a call between the user and a helper associated with the click-to-call feature.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
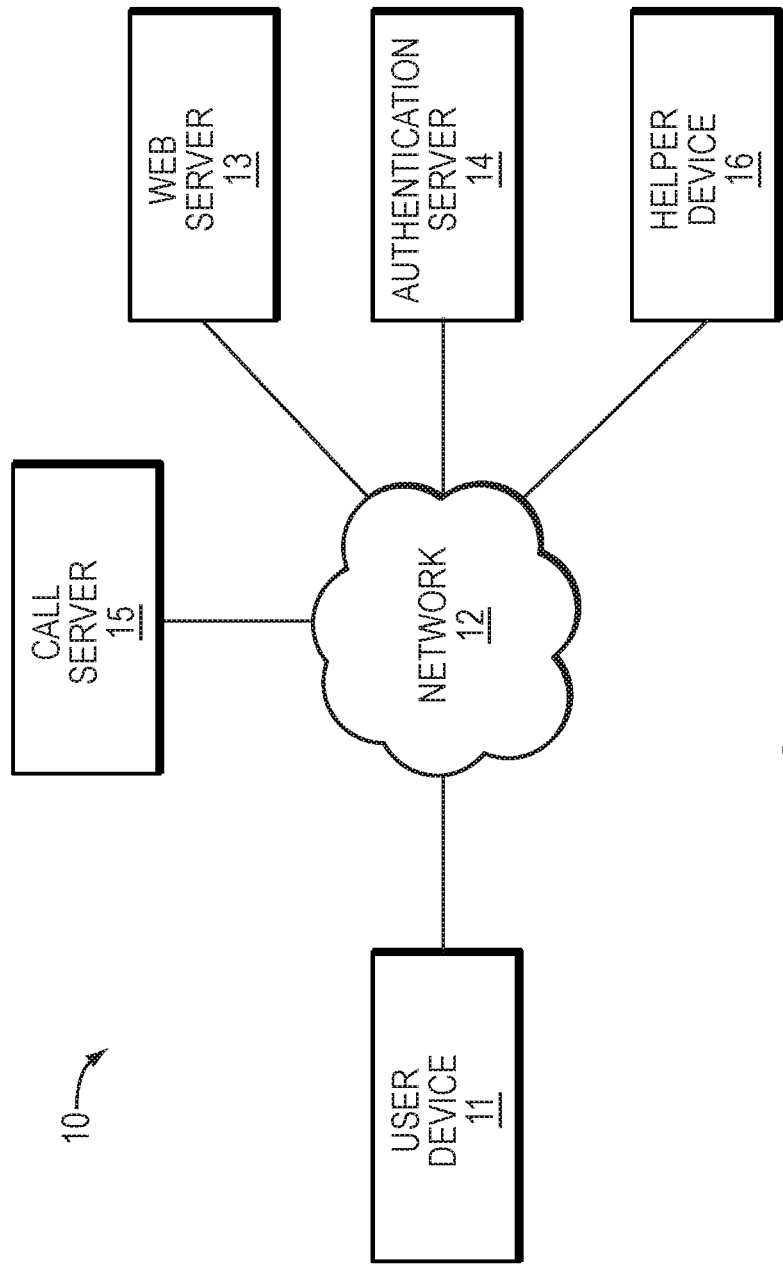
FIG. 1 is a block diagram illustrating an example environment according to one embodiment of the present invention.

FIG. 1 depicts an environment 10 that supports click-to-call (C2C) functionality according to one embodiment of the present invention. The environment 10 includes a user device 11, a network 12, a web server 13, an authentication server 14, a call server 15 and a helper device 16.

The user device 11 is any electronic device constructed and arranged to enable communication with the various components of the environment 10 over the network 12. For example, the user device 11 may include a desktop, portable personal computer, mobile device, mobile telephone, smart phone, personal digital assistant (PDA), wireless email device, workstation, kiosk, television set-top box, game console, or any other device that supports communication with the various servers and devices of the environment 10.

The network 12 is constructed and arranged to enable the various components of the environment 10 to communicate with one another. For example, the network 12 may comprise a global computer network such as the Internet, a wide area network (WAN), a local area network (LAN), a satellite network, a telephone or cable network, or various portions or combinations of these and other types of networks.

The web server 13 is constructed and arranged to enable the user device 11 to access a resource. For example, the web server 13 may be an online financial institution (e.g., an online bank, an online brokerage service, etc.) enabling the user device 11 access to a user account, access to protected financial data, the ability to complete online transactions, etc. Additionally, the web server 13 may be an online store (e.g., an online retailer, an online auction site, etc.) enabling the ability to complete online purchases, the ability to download online content such as books, music, movies, etc.

The authentication server 14 is constructed and arranged to authenticate the authenticity of requests to establish calls upon receiving communications resulting from interactions between users and click-to-call features (e.g., user interacting via user device 11 with a click-to-call feature on a website associated with the web server 13). Authentication server 14 is also constructed and arranged to select authentication methods and perform authentication operations upon receiving the requests. Authentication server 14 is further constructed and arranged to generate authentication results. Authentication server 14 is still further constructed and arranged to send authentication results over the network 12 to one of the components of the environment 10 with a view to facilitating a call between the user device 11 and the helper device 16.

The call server 15 is constructed and arranged to initiate calls between the user device 11 and the helper device 16 upon deeming requests to establish calls to be authentic. The call server 15 is also constructed and arranged to receive authentication results from the authentication server 14. For example, in the event that an authentication operation performed by the authentication server 14 indicates an authentic request, the authentication result forwarded to the call server 15 may include instructions to establish a call between the two endpoints and the call server 15 may initiate the call between the two endpoints (i.e., the user device 11 and the helper device 16) in response to the instructions. It should be understood that in at least one embodiment the call server 15 may be constructed and arranged to provide third party call control to initiate calls to both endpoints, wherein a bearer path is established between the endpoints if the user and the helper answer the respective calls.

The helper device 16 is constructed and arranged to enable a call between a user of the user device 11 and a helper that may be associated with a click-to-call feature. In one example, the helper device 16 may be associated with one or more call centers where numerous agents or helpers are made available to handle calls from any number of users that activate the click-to-call feature. Also, for example, the helper device 16 may be associated with a call center, Global Call Center, having main telephony addresses of globalcallcenter@xyz.com, 1-800-XYZ-CORP, and the like.

During operation, the user device 11 communicates with the web server 13. Here, the user device 11 provides a browser and a communication client, such that the browser can provide standard browsing functionality and include or be configured to cooperate with the communication client that is configured to support telephony communications at the user device 11. Via the browser, the user device 11 communicates with the web server 13 over the network 12, and the browser of the user device 11 sends a request to initiate a call between two or more endpoints in response to the user interacting with a click-to-call feature. The request will generally identify a source and a destination corresponding to the respective endpoints for the call with one of the endpoints associated with the user, such as the user device 11 in FIG. 1. The request will first, however, be assessed for authenticity before establishing the call.

Upon receiving a request to establish a call, the authentication server 14 performs authentication operations to determine the authenticity of the request by assessing risk in connection with the request. The authentication server 14 is able to determine the risk by obtaining information in connection with the request and performing an analysis of the information in order to ascertain the risk associated therewith. If the risk is deemed high, the authentication server 14 will reject the request and a call will not be established. If the risk is deemed low, the authentication server 14 will communicate with the call server 22 which will in turn facilitate a call between the two endpoints; e.g., the user device 11 and the helper device 16. The call, as will be appreciated, may be a voice call or any other type of call that enables communication between the user and the helper.

It should be appreciated that in operation the user device 11 may be connected directly or indirectly to the authentication server 14 for enabling risk assessment. For example, in at least one embodiment, the user device 11 may be directly connected to the authentication server 14 by virtue of call information in the click-to-call feature being associated with the authentication server 14 such that a direct connection is made between the user device 11 and the authentication server 14 when the user interacts with the click-to-call feature. In other embodiments, the user device 11 may be indirectly connected to the authentication server 14 via the web server 13. In either case, whether the user device 11 communicates directly or indirectly with it, the authentication server 14 is able to perform risk assessment of the requests to establish calls by obtaining information from the requests and performing a risk analysis to determine risk in connection with the requests.

Figure 2:
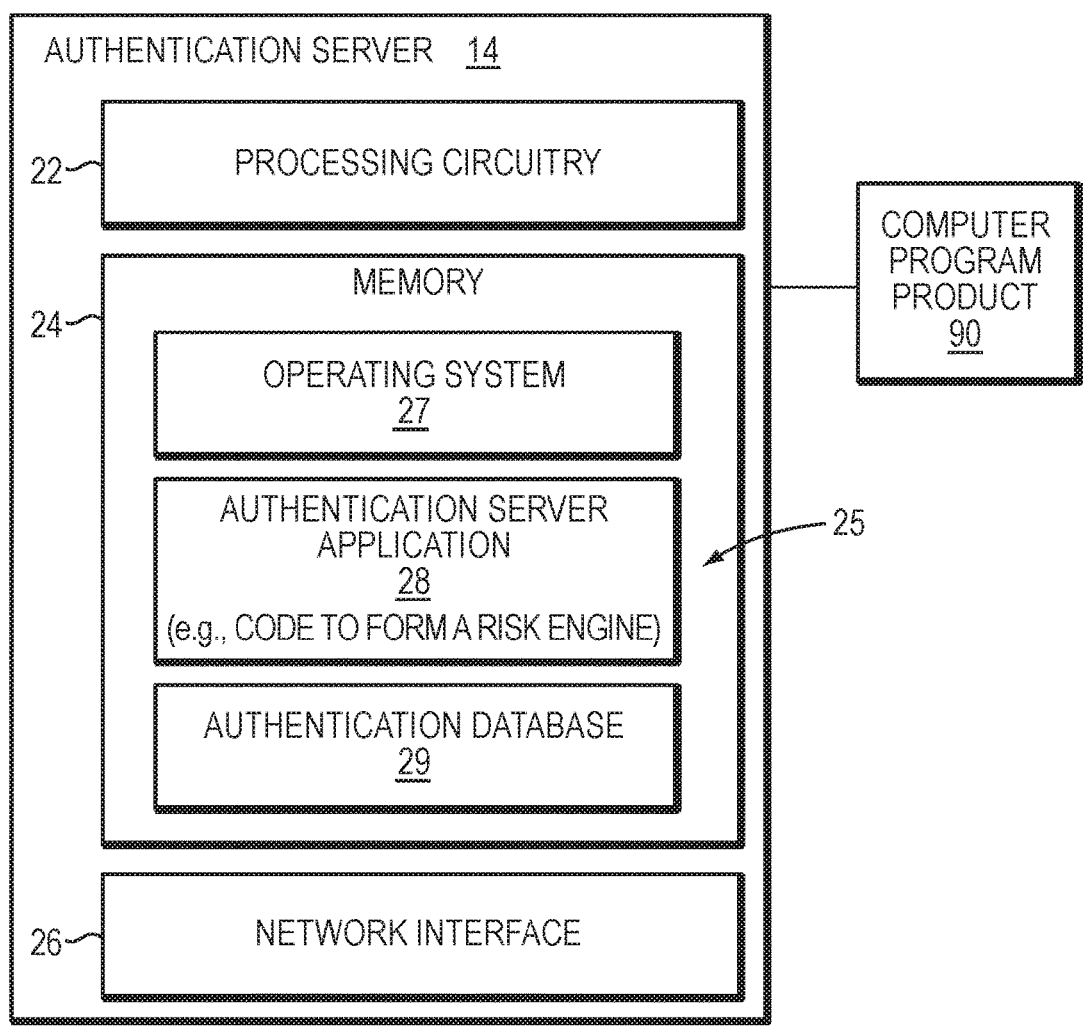
FIG. 2 is a block diagram illustrating a more detailed view of the authentication server in the environment of FIG. 1 according to one embodiment of the present invention.

FIG. 2 illustrates components of authentication server 14. Authentication server 14 includes processing circuitry 22, memory 24 and network interface 26.

Memory 24 is intended to represent both volatile storage (e.g., DRAM, SRAM, etc.) and non-volatile storage (e.g., flash memory, etc.). Memory 24 is configured to store a variety of software constructs 25 including an operating system 27 to manage resources of the authentication server 14, a specialized authentication server application 28 to perform authentication (e.g., to form a risk engine), and an authentication database 29 to store information for effective and efficient authentication. Memory 24 is further configured to store data associated with requests to establish a call.

Processing circuitry 22 is constructed and arranged to operate in accordance with the various software constructs stored in the memory 24. Such circuitry 22 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs to the authentication server 14. The computer program product 90 has a non-transitory (or non-volatile) computer readable medium which stores a set of instructions which controls one or more operations of the authentication server 14. Examples of suitable computer readable storage media include tangible articles of manufacture and apparatus which store instructions in a non-volatile manner such as CD-ROM, flash memory, disk memory, tape memory, and the like.

Network interface 26 is constructed and arranged to send and receive data over network 12. Specifically, network interface 26 is configured to receive requests and to send authentication results to other components of the environment 10.

During operation, the processing circuitry 22 runs the authentication server application 28 to form specialized control circuitry to perform various authentication server operations, e.g., to form a risk engine. That is, when the processing circuitry 22 runs the authentication server application 28, the specialized control circuitry performs authentication operations and outputs authentication results that indicate the likelihood that the requests to establish a call are authentic or associated with deceitful or fraudulent activity. Processing circuitry 22 generates authentication results based on information in connection with the requests. Further details regarding the generation of authentication result are described below.

It should be understood from the foregoing that the user device 11 communicates with the authentication server 14 via network interface 26 by sending a request to establish a call. Processing circuitry 22 stores information associated with the request in memory 24. Processing circuitry 22 obtains a black list from authentication database 29 to perform a lookup operation on the black list; that is, processing circuitry 22 compares the information in the blacklist to information associated with the request and determines whether there is an entry in the black list that is related to the current request from the user device. For example, the blacklist may relate to IP addresses, telephone numbers, etc. or any other type of attribute or behavioural feature associated with requests. If there is an entry in the black list linked to the request to establish a call then the request will be refused.

It should be understood that the authentication server may also obtain information from the database 29 in connection with previous requests to establish a call. It should be understood that certain attributes or behaviour may be deemed normal or acceptable when issuing requests to establish a call. For example, the requests may typically be issued from certain locations and/or times. If the current request deviates from this norm, the processor may determine that the request is risky. That is, if the current request is received from an abnormal location or at an abnormal time the request may be deemed risky. Also, the device fingerprints of previous requests may assist in risk assessment by comparing with the current request.

Figure 3:
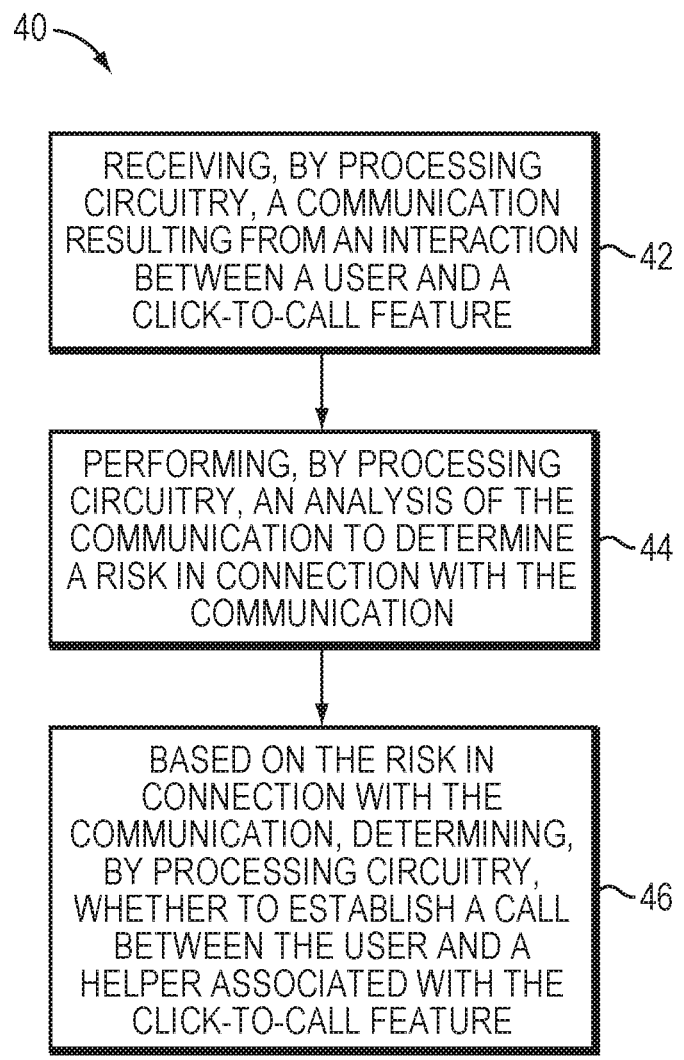
FIG. 3 is a flowchart illustrating a method according to one embodiment of the present invention.

FIG. 3 illustrates a flowchart 40 of processing steps that may be performed in an embodiment in accordance with techniques herein. In the flowchart 40, the steps are summarized in individual blocks. The steps may be performed in hardware, or as processor-executable instructions that may be executed by a processor or processing circuitry. Furthermore, the steps may, but need not necessarily, be implemented in the electronic environment 10 of FIG. 1.

At step 42, a communication is received resulting from an interaction between a user and a click-to-call feature. At step 44, an analysis of the communication is performed to determine a risk in connection with the communication. At step 46, a determination is made whether to establish a call between the user and a helper associated with the click-to-call feature based on the risk in connection with the communication.

Advantageously, the above steps as described when implemented in the environment 10 enable filtering of fraudulent and malicious attempts to abuse the click-to-call functionality. As discussed in foregoing paragraphs, the click-to-call feature allows a merchant to provide a one-click phone call directly from a webpage or search result to the merchant or someone associated with the merchant. Though easily implemented, the click-to-call feature is an easy target for malicious users. Competitors often exploit the click-to-call feature to harm merchants financially by misusing the service and cause false charges. The current approach can overcome these problems by assessing risk before a call is established. Using such a risk assessment, a merchant can estimate how risky it is to allow a certain user to avail of the click-to-call feature, and apply advanced filters to ensure only legitimate users are allowed to use the feature. Using a cloud-like risk-based system will also allow information to be shared regarding users that demonstrate fraudulent behavior across several businesses.

In one particular use case, a merchant may provide their contact number to a security service provider and receive a protected number in return. The merchant publishes or displays the protected number as the contact number relating to the click-to-call feature. Once a user clicks on the click-to-call feature from a search result or webpage or the like, a communication is sent to an authentication server which inspects the communication and gathers information to calculate the riskiness of allowing the user to utilize the click-to-call feature. For example, a user calling for a locksmith in Atlanta, while the user is in San Francisco, or requesting a service while originating from a blacklisted IP or phone number, can indicate a high-risk. After calculating the risk score and according to policy, a decision may be made whether to redirect the user to the merchant or not.

In an example scenario, suppose a legitimate user attempts to contact a business or merchant using the click-to-call feature. Once the user clicks on the click-to-call feature from a search result or webpage, the user will be redirected to a risk-based authentication server. The server will then acquire caller information and determine using a risk-engine the riskiness of allowing the user to use the click-to-call feature. Since, in this particular example, the risk-engine determines that the risk score is low, access is granted and the user is redirected to the merchant contact number.

Suppose, in another example scenario, a fraudulent user attempts to utilize the click-to-call feature from a blacklisted caller id. In this particular example, the risk-based authentication server calculates a high risk. Since the risk score is high, the server denies access and sends the caller a 'service not available, try again later' message, and adds information regarding the request to the blacklist. The fraudulent user attempts a different web page and sends a second click-to-call request. Once the user clicks on the click-to-call feature from a search result or webpage, the caller information will be sent to a risk-based authentication server. According to the caller information, the caller id is in the blacklist. Since the user is blacklisted, the server denies access and sends the user device a "service not available, try again later" message. The tracking of a fraudster in this use case provides a bigger picture which may assist in analyzing specific patterns. In one example, a surge in fraudulent uses of click-to-call on a financial institute may indicate that the institute is being targeted by fraudsters or competitors.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
   receiving, by processing circuitry, a communication resulting from an interaction between a user and a click-to-call feature displayed on a website to facilitate communication between the user and a business associated with the click-to-call feature;
   in response to receiving the communication, performing, by processing circuitry, an analysis of the communication, wherein the analysis comprises comparing a location associated with the communication and a location of the business to determine a likelihood of a fraudulent communication, further wherein the analysis comprises comparing a time associated with the communication and a time of one or more previous click-to-call communications to determine a likelihood of a fraudulent communication, further wherein the analysis comprises comparing an IP addresses and/or a telephone number associated with the communication and a blacklist comprising information relating to IP addresses and/or telephone numbers associated with fraudulent click-to-call communications to determine a likelihood of a fraudulent communication;
   based on the said analysis, determining, by processing circuitry, that the communication is a risky communication;
   in response to determining that the communication is a risky communication, refusing, by processing circuitry, to establish a call between the user and the business associated with the click-to-call feature;
   updating, by processing circuitry, the blacklists relating to fraudulent click-to-call communications to include information relating to the risky communication;
   analyzing, by processing circuitry, the updated blacklist and/or other information in connection with fraudulent click-to-call communications to determine one or more patterns in connection with fraudulent click-to-call communications; and
   sharing, by processing circuitry, the updated blacklists and/or the one or more patterns with one or more businesses in order to enable information to be shared regarding fraudulent activity across several businesses.

2. The method as claimed in claim 1, wherein a call is established when the risk in connection the communication is deemed low and a call is denied when the risk is deemed high.

3. The method as claimed in claim 1, wherein the click-to-call feature comprises contact information of a security service provider such that the communication is directed towards the security service provider in order to enable a determination of risk.

4. An apparatus, comprising:
   memory; and
   processing circuitry coupled to the memory, the memory storing program code which, when executed by the processing circuitry, cause the processing circuitry to:
   receive a communication resulting from an interaction between a user and a click-to-call feature displayed on a website to facilitate communication between the user and a business associated with the click-to-call feature;
   in response to receiving the communication, perform an analysis of the communication, wherein the analysis comprises comparing a location associated with the communication and a location of the business to determine a likelihood of a fraudulent communication, further wherein the analysis comprises comparing a time associated with the communication and a time of one or more previous click-to-call communications to determine a likelihood of a fraudulent communication, further wherein the analysis comprises comparing an IP addresses and/or a telephone number associated with the communication and a blacklist comprising information relating to IP addresses and/or telephone numbers associated with fraudulent click-to-call communications to determine a likelihood of a fraudulent communication;
   based on the said analysis, determine that the communication is a risky communication;
   in response to determining that the communication is a risky communication, refuse to establish a call between the user and the business associated with the click-to-call feature;
   update the blacklists relating to fraudulent click-to-call communications to include information relating to the risky communication;
   analyze the updated blacklist and/or other information in connection with fraudulent click-to-call communications to determine one or more patterns in connection with fraudulent click-to-call communications; and
   share the updated blacklists and/or the one or more patterns with one or more businesses in order to enable information to be shared regarding fraudulent activity across several businesses.

5. The apparatus as claimed in claim 4, wherein a call is established when the risk in connection the communication is deemed low and a call is denied when the risk is deemed high.

6. The apparatus as claimed in claim 4, wherein the click-to-call feature comprises contact information of a security service provider such that the communication is directed towards the security service provider in order to enable a determination of risk.

7. A computer program product having a non-transitory computer readable medium which stores a set of instructions, the set of instructions, when carried out by processing circuitry, causing the processing circuitry to perform a method, the method comprising:
  receiving a communication resulting from an interaction between a user and a click-to-call feature displayed on a website to facilitate communication between the user and a business associated with the click-to-call feature;
  in response to receiving the communication, performing an analysis of the communication, wherein the analysis comprises comparing a location associated with the communication and a location of the business to determine a likelihood of a fraudulent communication, further wherein the analysis comprises comparing a time associated with the communication and a time of one or more previous click-to-call communications to determine a likelihood of a fraudulent communication, further wherein the analysis comprises comparing an IP addresses and/or a telephone number associated with the communication and a blacklist comprising information relating to IP addresses and/or telephone numbers associated with fraudulent click-to-call communications to determine a likelihood of a fraudulent communication;
  based on the said analysis, determining that the communication is a risky communication;
  in response to determining that the communication is a risky communication, refusing to establish a call between the user and the business associated with the click-to-call feature;
  updating the blacklists relating to fraudulent click-to-call communications to include information relating to the risky communication;
  analyzing the updated blacklist and/or other information in connection with fraudulent click-to-call communications to determine one or more patterns in connection with fraudulent click-to-call communications; and
  sharing the updated blacklists and/or the one or more patterns with multiple users one or more businesses in order to enable information to be shared regarding fraudulent activity across several businesses.

8. The computer program product as claimed in claim 7, wherein a call is established when the risk in connection the communication is deemed low and a call is denied when the risk is deemed high.

9. The computer program product as claimed in claim 7, wherein the click-to-call feature comprises contact information of a security service provider such that the communication is directed towards the security service provider in order to enable a determination of risk.

* * * * *